May 8, 1956  H. D. WINTLE, JR., ET AL  2,744,409
ELECTROMAGNETIC DYNAMOMETER
Filed Sept. 14, 1953
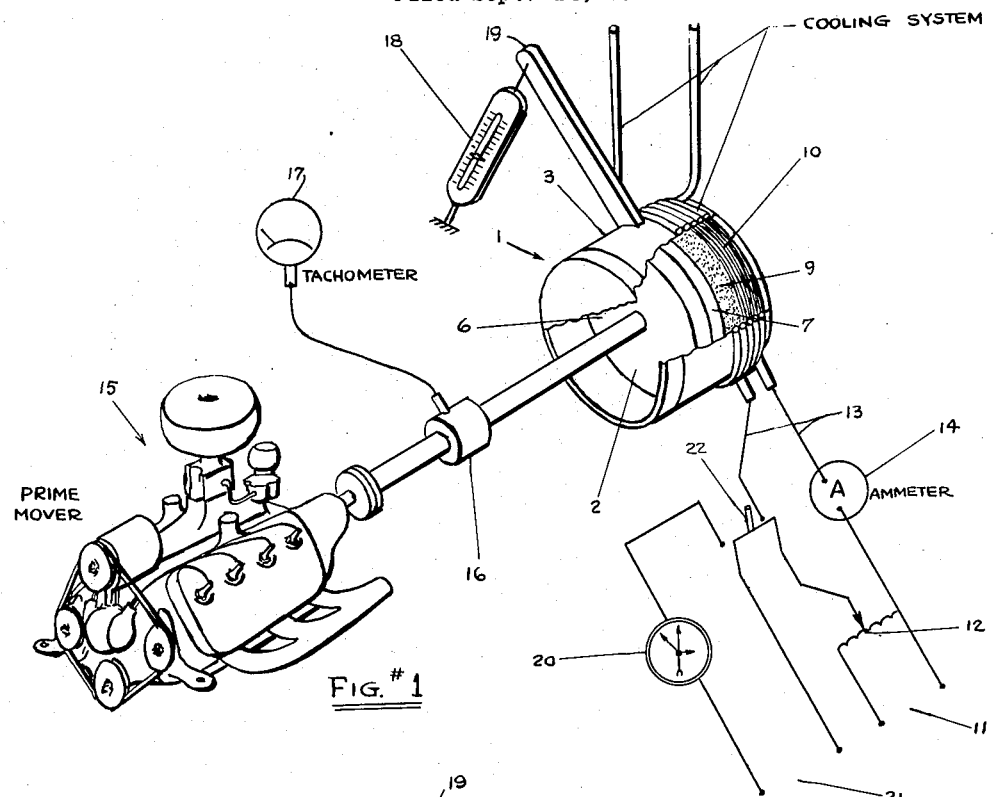
Fig. #1
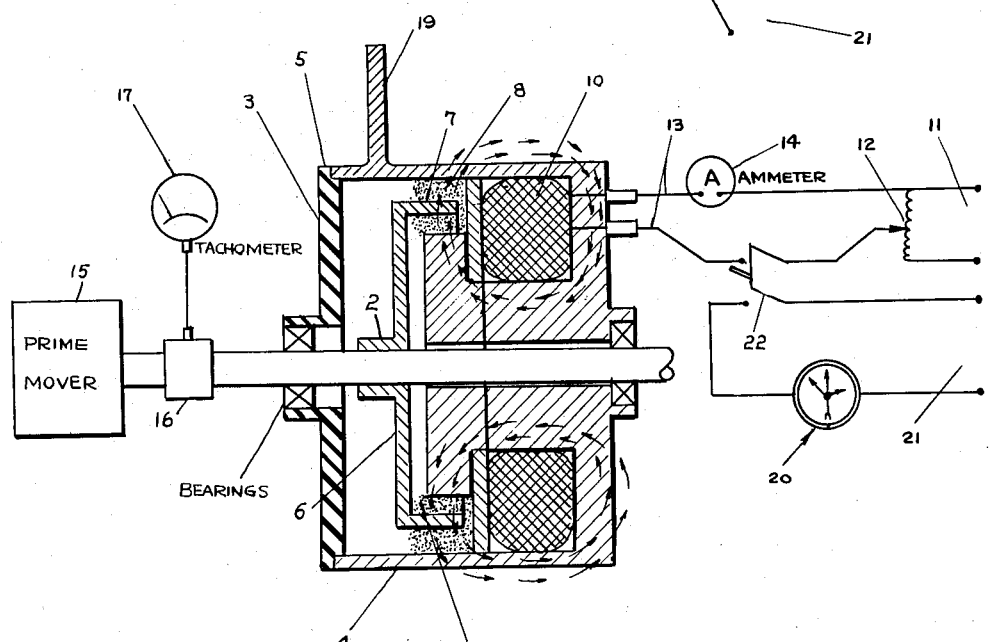
Fig. #2
INVENTORS
JOINT { HARRY D. WINTLE JR.
{ GEORGE E. STROM
BY John M. Calimafde
AGENT

United States Patent Office 2,744,409
Patented May 8, 1956

2,744,409

ELECTROMAGNETIC DYNAMOMETER

Harry D. Wintle, Jr., and George E. Strom,
Northampton, Mass.

Application September 14, 1953, Serial No. 380,073

3 Claims. (Cl. 73—134)

This invention relates to a torque measuring device known as a dynamometer and particularly to a magnetic dynamometer.

There are many known forms of torque measuring devices. One such device is the pony-brake which comprises a friction shoe attached to one end of a lever arm and a suitable scale coupled to the opposite end thereof. To measure the torque of a prime mover, the friction shoe is brought into contact with the shaft of the prime mover and the scale indicates the force developed by the prime mover. If the scale is calibrated in foot-pounds, this value multiplied by the revolutions-per-minute of the prime mover and a suitable constant is the measure of horsepower. This type of dynamometer is typical of the mechanical torque measuring devices. Although this type of dynamometer is suitable where coarse measurements at limited speeds are acceptable, it is not at all suitable where a high degree of accuracy over a wide range of speeds is required. This same objection applies to most known forms of electrical and mechanical torque measuring devices.

Therefore it is a first object of this invention to provide a dynamometer which is capable of measuring torque to a high degree of accuracy.

It is a feature of this invention to provide a dynamometer which is capable of measuring the torque both mechanically and electrically, whereby an accurate measurement may be obtained.

It is a further feature of this invention to provide a dynamometer which is capable of measuring the torque of a prime mover rotating at a very slow speed, e. g., 0.1 to 0.01 revolutions-per-minute and even slower.

It is a further feature of this invention to provide a dynamometer which is capable of measuring the torque accurately over a wide range of speeds.

It is a further feature of this invention to provide a dynamometer which is capable of measuring the moment of inertia of a rotating body.

It is a still further feature of this invention to measure the torque of a prime mover using an electromagnetic dynamometer.

In accordance with an aspect of this invention, there is provided an electromagnetic dynamometer comprising a rotatable magnetic member mounted on a shaft and a closely spaced relatively stationary magnetic member. In the space between the members there is provided a mass of relatively movable contiguous magnetic particles. The magnetic field is produced by a field winding positioned on the stationary member and when the winding is energized, an attractive force is produced between the particles and both of the members. The field winding is energized gradually until the torque of the rotatable member is transmitted through the mass. The invention is characterized by providing at least two different means for measuring the torque as applied to the stationary member so that a comparison of the two measurements may be made.

In accordance with another aspect of the invention there is provided a method of measuring the torque developed by a prime mover, the prime mover being coupled to the rotatable member of the electromagnetic dynamometer; the method comprises rotating the prime mover to a maximum speed at no external load and gradually applying a given electrical load. After the given load is applied and the R. P. M. of the prime mover becomes constant, the prime mover is developing a torque equal to the applied load. The torque is then measured on a mechanical measuring means and this value is compared with the given applied load as a check measurement. This method may be repeated a number of times with different applied loads for the purpose of plotting a graph of the characteristics of the prime mover.

The above objects and features will become more explicit when taken in conjunction with the accompanying drawing and description, wherein:

Fig. 1 shows the electromagnetic dynamometer coupled to a prime mover; and

Fig. 2 shows partly in cross-section the dynamometer.

Referring now to Fig. 1, there is shown an electromagnetic dynamometer generally indicated at 1, comprising a rotatable magnetic member 2 and a closely spaced relatively stationary member; the member 3 comprises a magnetic portion 4 and a non-magnetic cap portion 5.

The term "relative" as applied to the stationary member is with respect to the rotating member, so that if the relatively stationary member rotates slightly together with the rotatable member upon energization of the field winding causing attraction between the members, the member 3 is nevertheless stationary with respect to the member 2.

The rotatable member 2 comprises a disc 6 having a flange 7 circumferentially disposed thereon. The flange 7 may be either integral with the disc 6 or made as a separate member welded or otherwise suitably fastened to the disc. The flange is positioned to rotate in an annular space 8 (Fig. 2) defined within the stationary member 3. A mass of relatively movable contiguous magnetic particles 9 is provided in the space 8 between the members 2 and 3. The relatively movable contiguous particles are free to move or flow with respect to each other and with respect to the spaced surfaces and can be considered as separate particles in actual contact and free to move under the condition of no field excitation. The magnetic mixture may be a fluid mixture consisting of a suitable fluid vehicle such as molybdenum disulphide, and a quantity of finely divided ferromagnetic particles, or the iron particles may be used alone without the fluid.

A coil or field winding 10 is located within the enclosure provided by the stationary member 3 and coaxial with the flange 7 and disc 6. The coil 10 is energized by means of a source of power supply 11. The current supplied by the source is controlled by a potentiometer, autotransformer or rheostat 12 and fed to the coil 10 over leads and terminal connections 13. Serially connected between the source and coil is an ammeter 14 for measuring the current supplied to the coil 10. That portion of the lead wires between the ammeter and the terminal connections should be sufficiently long with the proper degree of freedom to permit slight rotation of the relatively stationary member without causing the leads to be pulled free of the terminal connections or the ammeter.

A water jacket (as shown) may be provided enclosing the relatively stationary member to dissipate the heat absorbed by the stationary member and coils upon application of the load to the dynamometer.

When the field winding is energized, the particles are attracted to each other, whereby the adhesive consistency of the mass of particles is increased so that resistance is offered to the relative motion of the particles and the members.

In accordance with the first aspect of the invention, the torque as applied to the stationary member is measured by two different measuring means, whereby a comparison of the two measurements may be made. By taking two readings from the two different measuring means, a slightly inaccurate reading on one instrument will be compensated by extrapolating it with the reading of the second instrument. Of course, when both readings on the two instruments are identical, one may be reasonably certain that the readings are accurate, and therefore one reading serves as a check against the other.

Referring now to Figures 1 and 2, and by way of example, there is shown an automobile engine 15 as the prime mover whose torque is to be measured. The prime mover is coupled by a shaft 16 to the rotatable member 2; a tachometer 17 is coupled to the shaft 16 in the conventional manner to measure the revolutions-per-minute of the prime mover 15. If the ammeter 14 is calibrated in foot-pounds, the product of this value, a suitable constant and the tachometer reading represents the horsepower developed by the prime mover. To obtain an accurate reading on the ammeter, the field winding should be energized gradually, to produce a magnetic field (as shown by the small arrows in Fig. 2) of gradually increasing intensity until there is complete attraction between the particles and the two members. This point would be represented by a braking action on the rotatable member and is the point at which the full torque of the rotatable member is transmitted through the magnetic particles to the stationary member.

A second torque measurement is obtained from a calibrated means such as a spring scale 18, which may be calibrated in foot-pounds. The scale is attached to one end of a lever 19 and the other end thereof is fastened by any appropriate means to the periphery of the stationary member 3.

The lever-scale-tachometer combination represents a mechanical measuring means and the tachometer-ammeter combination is in principle a basically different form of horsepower measuring means; the two together constituting an accurate torque measuring system.

In accordance with the second aspect of the invention there is provided a novel and extremely accurate method of measuring the torque of the prime mover. The accuracy of this method is most apparent when it is desired to measure the torque of a prime mover operating at either very slow or very high speeds where measuring devices such as the pony-brake become completely impractical. The inventive method comprises the steps of rotating the prime mover to a maximum speed at no external load and gradually applying a given electrical load. This load is known from the tachometer-ammeter reading. After the known load is applied and the revolutions-per-minute of prime mover becomes constant, the prime mover is developing a torque equal to the applied load. The torque is then also measured on the tachometer-spring scale combination and this value is compared with the recorded value of the applied load. If the two readings are not identical, interpolation may be used to obtain corrected and more accurate readings. This method may be repeated a number of times with different applied loads for plotting a complete graph of the prime mover characteristics.

It should be apparent that this process is especially suitable for measuring even the smallest torques of miniature and sub-miniature prime movers, such as, synchro-transmitters, etc. Stalling and starting torques may also be accurately measured in this manner.

This invention may also be used for measuring moments of inertia of the prime mover. To measure the moment of inertia, an electrical timer or elapse time totalizer 20 is connected in a circuit with a power supply 21 for the timer, and one side of a double-pole switch 22. The other side of the double-pole switch 22 is connected in the feed circuit of the coil 10. Therefore the timer 20 is operated simultaneously with the energization of the coil, and the time it takes the prime mover to come to rest after energization of the coil may be accurately measured. The switch 22 may be manually or automatically opened after the prime mover comes to rest to stop the running of the timer. The moment of inertia is computed from the known load applied to the freely rotating body whose initial velocity is known from the tachometer reading and the time it takes for the body to come to rest. Expressed mathematically $$I = \frac{\text{Torque}}{\alpha}; \quad \alpha = \frac{\omega - \omega_0}{t}$$

where $I$ = moment of inertia
$\alpha$ = angular deceleration in radians per second
$\omega$ = initial velocity
$\omega_0$ = final velocity
$t$ = time in seconds.

While there is described herein the principles of operation of the invention together with an embodiment thereof, it will be understood that the apparatus disclosed is only illustrative and that other means and apparatus may be employed without departing from the spirit and scope of the invention as defined by the appended claims.

What is claimed is:

1. An electromagnetic dynamometer comprising a rotatable magnetic member mounted on a shaft and a closely spaced relatively stationary magnetic member, a mass of relatively movable contiguous magnetic particles in the space between said members, an electrical winding positioned on said stationary member, a source of energizing current, means coupled between said winding and said source of energizing current for controllably varying the current applied to said winding, whereby a correspondingly varying magnetic field is produced across said space, a torque measuring means coupled to said relatively stationary member, an electrically controlled timing device, switching means coupling said winding and said timing device to said source of energizing current, whereby upon closing said switching means said energizing current is simultaneously applied to said winding and timing device, so that the time it is required to apply a given energizing current to the winding may be observed.

2. The device according to claim 1, wherein said torque measuring means comprises an arm extending from said stationary member, and an indicator coupled to said arm.

3. The device according to claim 1, and further comprising an ammeter coupled in a line joining said source of energizing current to said winding, whereby the current indication may be used as a factor in computing the torque.

References Cited in the file of this patent

UNITED STATES PATENTS

| | | |
|---|---|---|
| 1,553,802 | Claypoole | Sept. 15, 1925 |
| 2,106,542 | Winther | Jan. 25, 1938 |
| 2,447,588 | McNairn | Aug. 24, 1948 |
| 2,642,740 | Stephenson | June 23, 1953 |
| 2,668,441 | Peterson | Feb. 9, 1954 |
| 2,679,157 | Carpenter | May 25, 1954 |

FOREIGN PATENTS

| | | |
|---|---|---|
| 406,836 | Germany | Dec. 3, 1924 |

OTHER REFERENCES

The Magnetic Fluid Clutch, Jacob Rabinow in Transactions of A. I. E. E., Dec. 13, 1948, vol. 67, 8 pages.